Jan. 23, 1968

K. C. BUGG 3,364,760

ANTI-BACKLASH FRICTIONAL DRIVE

Filed Feb. 23, 1965

Inventor:
Kenly C. Bugg,
Hume, Groen, Clement + Hume.
Attys.

Jan. 23, 1968 K. C. BUGG 3,364,760
ANTI-BACKLASH FRICTIONAL DRIVE
Filed Feb. 23, 1965 4 Sheets-Sheet 2
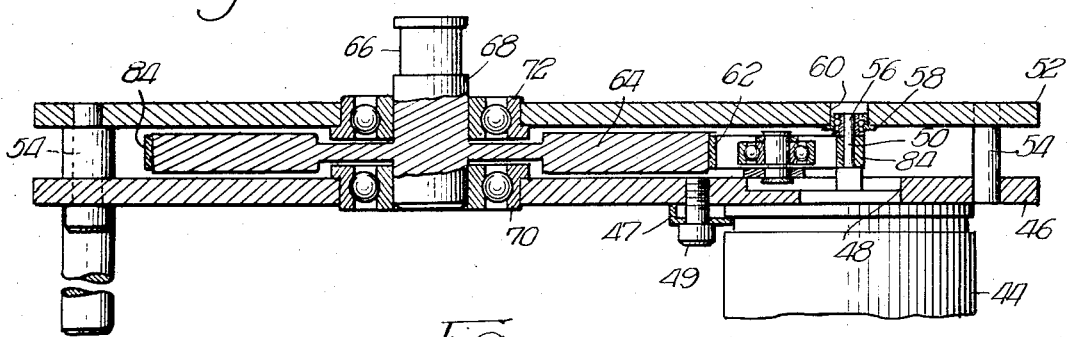
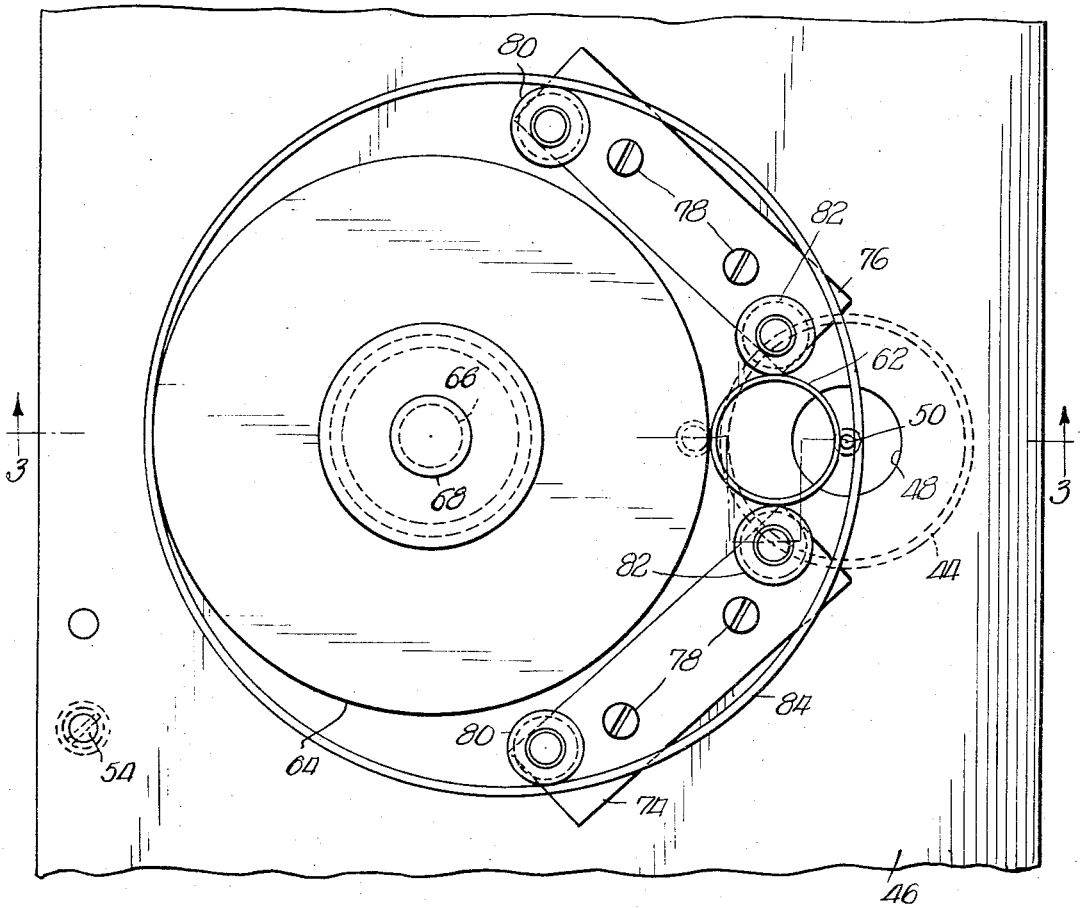
Inventor:
Kenly C. Bugg,

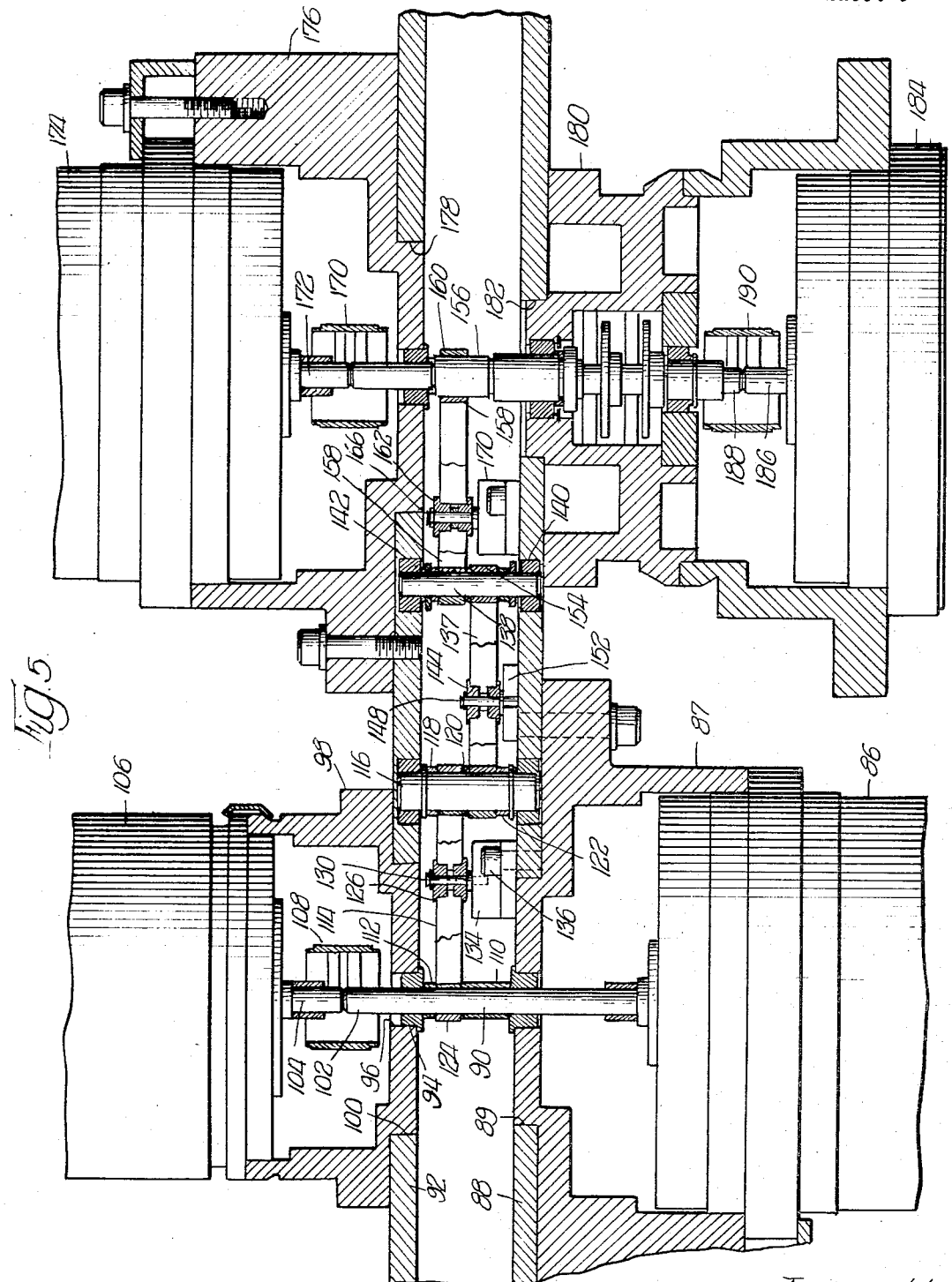

Jan. 23, 1968   K. C. BUGG   3,364,760
ANTI-BACKLASH FRICTIONAL DRIVE
Filed Feb. 23, 1965   4 Sheets-Sheet 4

Inventor:
Kenly C. Bugg,
Hume, Groen, Clement & Hume
attys.

United States Patent Office 3,364,760
Patented Jan. 23, 1968

3,364,760
ANTI-BACKLASH FRICTIONAL DRIVE
Kenly C. Bugg, Fort Wayne, Ind., assignor to Kendick Manufacturing Company, Inc., Fort Wayne, Ind., a corporation of Indiana
Filed Feb. 23, 1965, Ser. No. 434,561
8 Claims. (Cl. 74—206)

This invention relates to an anti-backlash frictional drive, and more particularly, to a drive mechanism which is especially adapted for use in the effective lateral transfer of motion between rotating elements, either with or without a speed change.

Electro-mechanical control systems have achieved a high degree of development, and their use in computers, space vehicles and similar installations has created a demand for highly accurate and reliable drive mechanisms. When used in servomechanisms, especially those employing rotary signal transducers, it is necessary to reduce the sources of error to a minimum to establish precise control. Common sources of error in such devices are backlash, resiliency, inertia and wear. Obviously, the device must also be as free from undesirable friction as possible. Furthermore, the need for precision, miniature components in such control systems is particularly great, because of the great emphasis on space and weight saving that is common to many fields of activity utilizing such control devices.

Another environment in which there is a demand for highly accurate and reliable drive mechanisms is in the field of tape recording devices. In such mechanisms, the elimination of flutter, jitter, and other undesirable aberrations is continually sought since the accuracy and fidelity of the reproduction from a tape is directly dependent upon the character of the drive mechanism utilized. In such a drive, it is particularly desirable to eliminate conventional type gears having teeth. The use of teeth elements as a means of conveying motion is, in itself, a source of substantial error since the configuration of the teeth themselves must necessarily be such that an angular velocity change is inherent in their operation as a drive mechanism. A frictional drive mechanism, on the other hand, presents a smooth linear drive motion as long as errors such as backlash, resiliency, inertia and wear, mentioned above, can be eliminated or reduced to an absolute minimum.

It is, therefore, an object of this invention to provide a frictional drive mechanism that is useful for the transfer of motion between rotating elements; that is extremely accurate; that lends itself particularly to extreme miniaturization without any loss of accuracy or greatly increased cost; and that, at the same time, has a relatively simple construction.

A further object is to provide a drive mechanism of the character described in which the amount of undesirable backlash and resilience has been reduced to a minimum, and in which undesirable inertia effects have been substantially eliminated. Likewise, it is an object to provide a device in which there is a minimum of wear, but equally important, when and if wear occurs, it produces merely a change in ratio that is purely linear, rather than the very undesirable non-linear change that normally occurs in a gear train type of drive arrangement, as a result of an increase in backlash. A still further object is to provide a drive mechanism of the character described in which undesirable friction has been reduced to a minimum.

A further object is to provide a drive mechanism which may be used in a laterally ganged arrangement and which, when so arranged, will have a low torque requirement at the input end of such an assembly but may have a relatively high torque load clutch release at the output end. Furthermore, with this arrangement, elements such as signal transducers can be assembled in tandem, one to the other, without the undesirable reversing error normally encountered with gear trains so assembled. Also, the undesirable fulcrum effect of spring loaded or anti-backlash gears is eliminated.

Further objects and advantages of this invention will become evident as the description proceeds and from an examination of the accompanying drawings which illustrate several embodiments of the invention and in which similar numerals refer to similar parts throughout the several views.

In the drawings:

FIGURE 3 is a view in elevation, with certain parts cut away, of another form of device incorporating an embodiment of the invention similar to that shown in FIGURE 1, the device again being shown disposed in association with a drive motor (shown in fragmentary form) and a driven component such as the capstan of a tape deck.

FIGURE 4 is a plan view of the device shown in FIGURE 3, with the upper supporting plate removed and the lower plate being shown in fragmentary form, with other components being shown somewhat diagrammatically.

FIGURE 5 is a view in elevation with certain parts cut away, of another alternative form of device incorporating an embodiment of the invention, utilizing a laterally ganged arrangement, the device being shown disposed in association with a drive motor, an encoder, a high-speed torque transmitter, a reducer, and a low-speed torque transmitter, the latter three elements being shown only in fragmentary form and somewhat diagrammatically.

Figure 6:
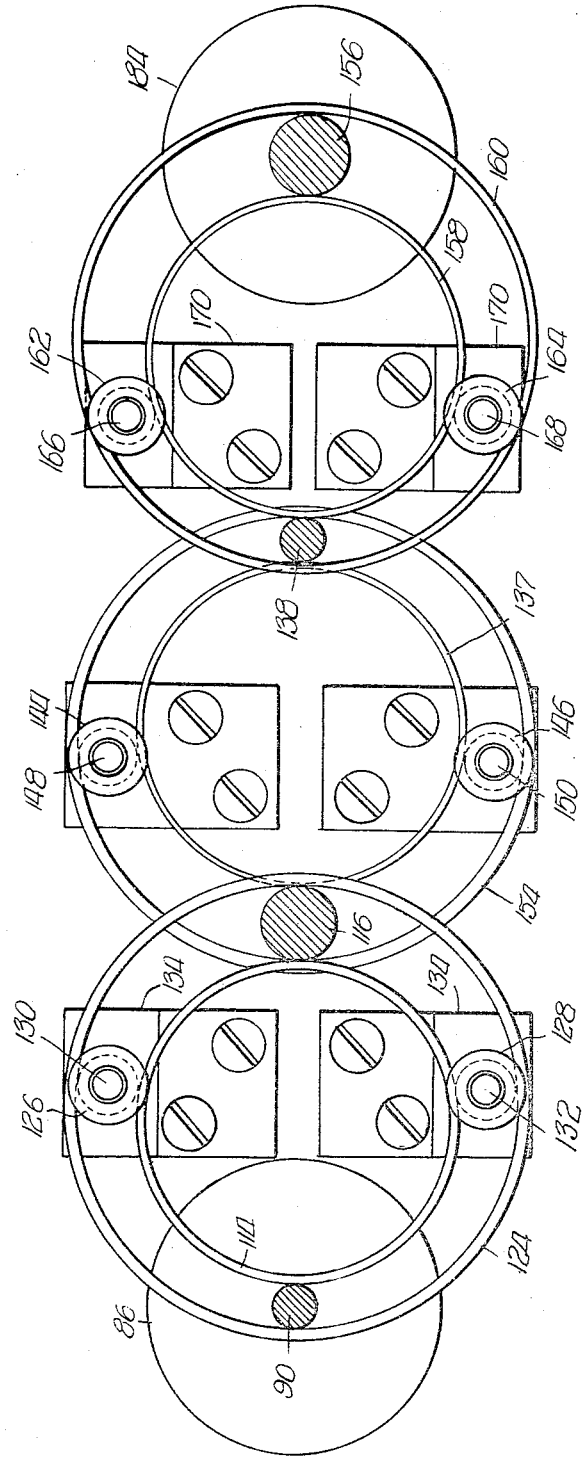

FIGURE 6 is a somewhat diagrammatic representation of the operative relationship of certain of the components of the device shown in FIGURE 5, the view being taken along the line 6—6 of that figure.

Figure 1:
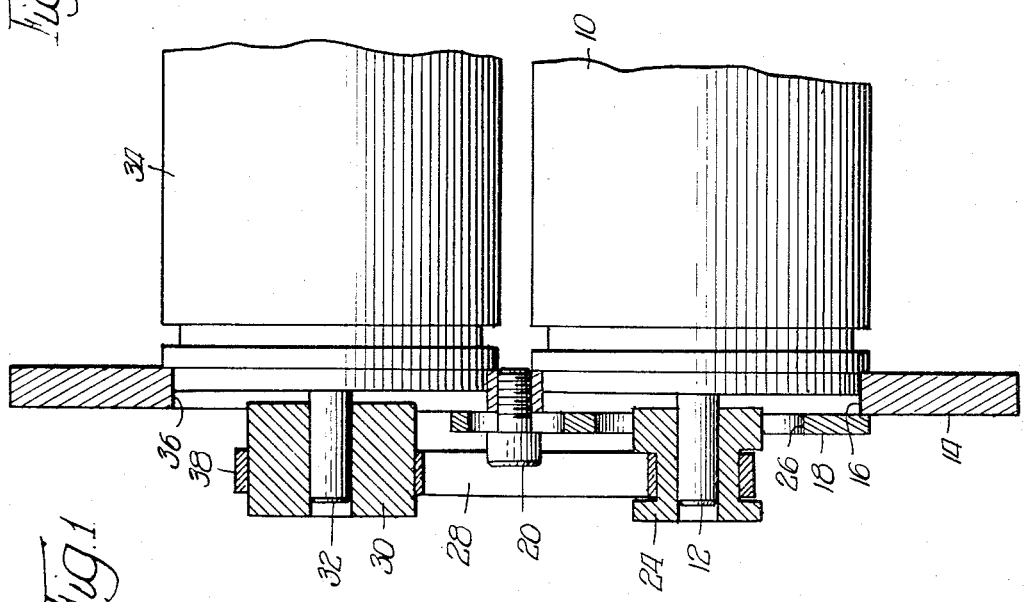
FIGURE 1 is a view in elevation, with certain parts cut away, of one form of anti-backlash friction gear drive incorporating the invention, the device being shown disposed in association wiht a drive motor and a driven component, such as a control transformer, the latter two elements being shown only in fragmentary form.

Referring now to FIGURE 1, one form of drive mechanism incorporating the invention is shown therein in the form of an anti-backlash friction gear drive providing for the lateral transfer of rotary motion. An electric motor 10 having a drive shaft 12 is mounted in association with the plate 14 in the opening 16 provided for that purpose. A bearing plate 18 is also secured to the plate 14 by the retaining screws 20, each extending through a slot 22 in the plate 18. The slots 22 provide a means of adjusting the relative position of the plates 14 and 18 for a purpose which will be described below.

The drive shaft 12 has a flanged friction gear 24 securely mounted thereon so as to rotate therewith, both the shaft 12 and the friction gear 24 extending through the opening 26 in the plate 18 provided for that purpose. A resilient rolling member in the form of the ring 28 is mounted under compression between the friction gear 24 and the friction gear 30, which is in turn secured to the shaft 32 of the control transformer 34. The transformer 34 is mounted to the plate 14 in the same manner as the motor 10 in the opening 36 provided for that purpose.

A compression ring 38 encompasses the friction gear 24, the ring 28 and the friction gear 30 so that its inner surface is in rolling frictional contact with the friction gears 24 and 30. The dimensions of the ring 38 are such that it applies a compressive force to these friction gears 24 and 30 which force is diametrically opposed to the force applied to them by the ring 28. The plate 18 also carries two idler rollers 40 and 42 rotatably mounted thereon and having a diameter such that they are adapted to be moved into compressive, rolling, frictional engagement with the ring member 28 while simultaneously exerting an outwardly directed force on the inner surface of the compression ring 38, while likewise being disposed in rolling frictional engagement with the inner surface thereof. The amount of force exerted in this fashion by the idlers 40 and 42 can be adjusted by the positioning of the plate 18 through the medium of the slots 22 and the retaining screws 20, previously described.

Figure 2:
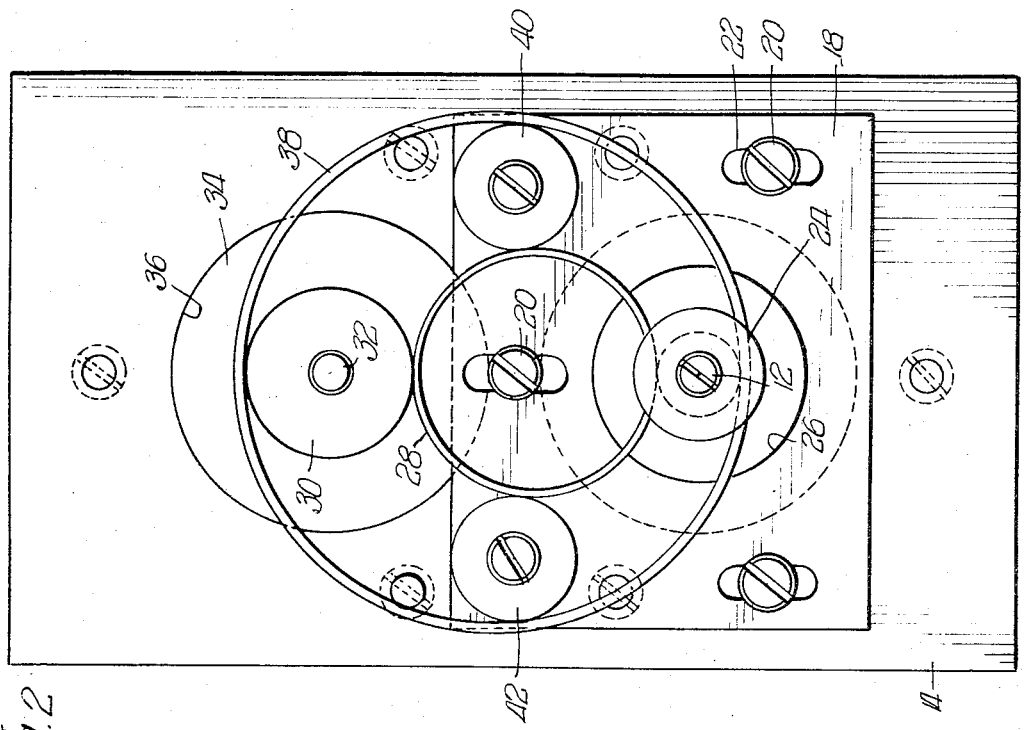
FIGURE 2 is an end view of the device shown in FIGURE 1, the view being taken looking forward the right in that figure.

The arrangement of components shown in FIGURES 1 and 2 provides an anti-backlash frictional drive between the drive shaft 12 of the motor 10 and the driven shaft 32 of the control transformer 34. As the drive shaft 12 rotates, the drive gear 24 will rotate, causing the compressible ring 28 to rotate. Since this latter member is in compressive, rolling, frictional engagement with the friction gear 30, it in turn will be caused to rotate, as will the shaft 32 operatively associated therewith, as shown in FIGURE 1.

Not only is rolling frictional contact maintained between the two friction gears 24 and 30 as described, but it is maintained in such a way that there is no backlash in the drive mechanism regardless of the direction of rotation of the shaft 12. This characteristic results, of course, from the fact that there is a tight frictional engagement at all times between the rotating members which is insured by the balancing of the compressive and expansive forces within the various components, which forces are in this form preferably asserted along a components, which forces are in this form preferably asserted along a common diametric axis.

This type of drive arrangement insures the automatic elimination of backlash even if the components become worn because the compressive and expansive forces can be renewed by an adjustment of the idlers 40 and 42 when required. Any decrease through wear in the diameter of the motion transmitting elements can be compensated by a shift in position of the idlers sufficient to take up any slack which may be created. Furthermore, it should be pointed out that since the rolling elements 28, 38, 40 and 42 are merely motion transmitting elements utilizing rolling surface contact, a change in the diameter of any of these elements will not affect the operation of the device, insofar as a change in ratio is concerned. Furthermore, if, as a result of wear, the diameter of any of the friction gears is reduced, the ratio of the device will be changed in a completely linear fashion. A change of this type can be tolerated in many types of installations where a non-linear change would be highly disadvantageous, such as in servomechanism devices, for example.

Such a change in ratio will normally be very slight, but even this can be practically eliminated by a proper design of the equipment, since the rolling members can be made of softer material than the friction gears 18 and 20 so that substantially all the wear occurs in the rolling members. As pointed out above, wear or changes of dimension in these rolling elements has no effect on the drive ratio. Such a characteristic permits the ready attainment of the desired precision in such devices, which does not degenerate rapidly with operation and resultant wear. This, then, is another important advantage of the invention.

Not only is the major undesirable characteristic of backlash eliminated by the invention, but there is the added advantage that the error which is attributable to the resilience of the elements, such as gear teeth in a conventional gear train, is very substantially reduced in this type of arrangement through the use of rolling, frictional drive elements instead of such conventional gears.

An alternative embodiment of the invention is shown in FIGURE 3, where the geometry of the components is such that a single pair of idler rollers is not capable of being utilized. The particular embodiment shown is a drive mechanism for the capstan of a tape deck. A drive motor 44 is secured to a mounting plate 46 in the opening 48 provided therefor. Suitable bracket members 47 secured to the mounting plate 46 by the threaded members 49 are adapted to lock the motor 44 in association with the opening 48. The drive shaft 50 of the motor 44 extends between the mounting plate 46 and the adjacent mounting plate 52 which is secured in spaced relation to the former by spacing members 54. The upper end 56 of the drive shaft 50 is rotatably mounted in the bearing member 58 received within the opening 60 in the mounting plate 52.

The drive shaft 50 of the motor 44 has associated therewith in rolling, frictional engagement the resilient rolling member in the form of the ring 62 which is also in rolling, frictional engagement with the friction gear 64 formed integrally with the capstan 66. The ring member 62, here again, is under compression so that the rolling contact between the members 50 and 64 is quite positive. The shaft portion 68 of the friction gear member 64 is rotatably mounted in both the mounting plates 46 and 52 through the roller bearing elements 70 and 72, respectively. A pair of mounting plates 74 and 76 are secured to the plate 46 through suitable retaining members 78 and, in turn, each carries a pair of idler members 80 and 82. The idler rollers 82 are so positioned that they can be brought into compressive relation with the ring member 62 in a substantially diametrically opposed relation. The idler members 80 at the opposite end of the plates 74 and 76 are disposed so that they can be brought into juxtaposition with the inner surface of the compression ring member 84.

The ring member 84 is disposed in compressive relation with the shaft 50 of the motor 44 and the friction gear member 64 as best shown in FIGURE 4. The ring member 84 thus encompasses the shaft 50, the idler rollers 80 and the friction gear 64 in such a way that a compressive force is applied to the shaft member 50 in substantially diametrically opposed relation to the force exerted on the shaft 50 by the ring member 62. Likewise, the ring member 84 exerts a compressive force on the friction gear member 64 at a point substantially diametrically opposite to the point at which the ring member 62 applies an opposite force to the friction gear 64.

Just as in the case of the embodiment shown in FIGURES 1 and 2, the compressive and expansive forces are therefore in balance so that a very effective and reliable rolling contact is maintained between the rotating elements. These forces can be adjusted by slight movement of the plates 74 and 76 in such a way as to shift the relative position of the idler rollers 80 and 82 to, in turn, vary the force exerted by the ring 62 and by the ring member 84. This embodiment thus has all of the advantages previously mentioned above with respect to that shown and described in FIGURES 1 and 2.

Still another embodiment of the invention is illustrated in FIGURES 5 and 6 wherein the form of the invention shown in FIGURES 1 and 2 is utilized in a ganged relationship to achieve a particular arrangement of driven components, both as to location and speed ratio. As shown in FIGURE 5, a drive motor 86 is secured to the mounting plate 88 by a suitable mount 87 in the opening 89 so that the drive shaft 90 thereof extends through the second mounting plate 92 secured in spaced relation to the mounting plate 88. A suitable bearing 94 is provided in the opening 96 in the mounting member 98 which is suitably secured in the opening 100 in the mounting plate 92. The upper end 102 of the shaft 90 is coupled to the shaft 104 of the encoder 106 by a suitable coupling member 108, shown diagrammatically.

The portion of the shaft member 90 which extends between the mounting plates 88 and 92 is provided with two sleeve members 110 and 112, which have suitable space provided therebetween for receiving the ring member 114, which is disposed in compressed relation between and in rolling frictional contact with the shaft member 90 and the idler shaft member 116. The latter member is rotatably mounted in both the mounting plate 88 and the mounting plate 92 so that it extends therebetween. Suitable sleeve members 118, 120 and 122 are provided on the shaft 116 so that the ring member 114 and the additional ring member 124 are maintained in proper alignment in rolling frictional contact therewith.

As best shown in FIGURE 6, a compression ring member 124 is also provided and is disposed in rolling frictional contact with the shaft members 90 and 116. It is likewise disposed so that it encompasses not only these two shaft members, but also the ring member 114 and the two idler roller assemblies 126 and 128 mounted on the shafts 130 and 132 respectively. Suitable mounting blocks 134 secured to the mounting plate 88 by retaining means 136 are provided for the shafts 130 and 132. As best shown in FIGURE 5, the idler roller assemblies 126 and 128 are flanged so that they will maintain the ring member 114 in alignment.

The operation of the drive assembly described thus far is substantially identical to the operation of that form previously described and illustrated in FIGURES 1 and 2. Rotation of the drive shaft 90 causes rotation of the ring member 114, which, in turn, transmits rotary motion to the idler shaft 116. The compressive and expansive forces are again balanced in the system so that the transfer of motion is both efficient and positive, the ring member 137 being provided, disposed in rolling, frictional contact with the idler shaft 116 and having a construction and function substantially identical to the ring member 114 previously described.

Ring member 137 is also in rolling frictional contact with a second idler shaft member 138 which is mounted in the bearing members 140 and 142 in the mounting plates 88 and 92 respectively. Idler members 144 and 146, similar to idler members 126 and 128, are mounted on shafts 148 and 150, respectively. These shafts, in turn, are supported by block members 152, secured to the mounting plate 88. The idler members 144 and 146 perform the function of compression of the ring member 137 and expansion of the ring member 154 which encompasses the members 116, 137, 138, 144, and 146, substantially as previously described in connection with the function of idler members 126 and 128. The operation of this motion transmitting assembly is, therefore, substantially the same as that described for the previous assembly, the only significant variation being the somewhat different orientation of the roller members 144 and 146.

A similar motion transmitting assembly is disposed between the shaft member 138 and the shaft 156, rotatably supported between the mounting plates 88 and 92. This latter assembly is made up of the ring members 158 and 160, together with the idler rollers 162 and 164, the latter two elements being mounted on the shaft members 166 and 168 respectively, which are, in turn, carried by the mounting blocks 170. Again there is a slight variation in the particular disposition of the idler rollers 162 and 164, but otherwise the construction and operation of this motion transmitting assembly is the same as those two previously described.

Motion imparted to the shaft 156 is transmitted to a suitable coupling member 170 to the shaft 172 of the high-speed torque transmitter 174, mounted in association with the mounting plate 92 by the mounting means 176. The mounting member 176 is secured in the opening 178 in the mounting plate 92 is a manner such that the shaft 172 is in axial alignment with the shaft 156. The shaft 156 is also shown in association with a reducer shown diagrammatically and indicated generally by the numeral 180, mounted in association with the mounting plate 88 in the opening 182 provided for that purpose. A low-speed torque transmitter 184 is secured in association with the reducer 180, the input shaft 186 of the torque transmitter 184 being coupled to the output shaft 188 of the reducer 180 by suitable coupling means 190.

FIGURE 6 shows in somewhat diagrammatic form the interrelation between the driving and driven components in this arrangement. The configuration of the components in the particular frictional drive mechanism shown in FIGURE 6 are such that the drive ratio is 16 to 9 input to output, and therefore, the drive acts as a reducer. These ratios can be varied as desired, of course, being dependent upon the diameters of the shafts 90, 116, 138, and 156.

The particular characteristics mentioned above of a drive mechanism embodying the invention are particularly desirable in an arrangement such as is shown in FIGURES 5 and 6, where any backlash would have serious effects on the accuracy of the equipment. It may thus be seen that a significant advance has been made in antibacklash frictional drives which are particularly adapted to certain specialized uses.

In the drawings and specification there has been set forth several preferred embodiments of the invention, and although specific terms are employed, they are used in a generic and descriptive sense only and not for purposes of limitation. Changes in form and in the proportion of parts, as well as the substitution of equivalents, are contemplated, as circumstances may suggest to render expedient, without departing from the spirit or scope of this invention as further defined in the following claims.

What is claimed is:

1. A friction drive comprising: a rotating drive member; a resilient rolling member in driven frictional engagement with said drive member; a driven member in driven frictional engagement with said resilient rolling member, a resilient compression ring member having its interior surface disposed in rolling frictional engagement with said drive member and said driven member; and rotating idler members adapted to apply an expansive force to the interior surface of said compression ring and a compressive force to the exterior surface of said resilient rolling member.

2. A friction drive of the character defined in claim 1 further characterized in that said resilient rolling member is in the form of a slightly compressible ring member.

3. A friction drive of the character defined in claim 1 further characterized in that said drive member has associated therewith means for confining said rolling member within a restricted area of contact along the longitudinal axis of said drive member.

4. A friction drive comprising: a rotating drive member; a resilient rolling member in driven frictional engagement with said drive member; a driven member in driven frictional engagement with said resilient rolling member; a resilient compression ring member having its interior surface disposed in rolling frictional engagement with said drive member and said driven member; and a pair of rotating idler members in compressive engagement with said rolling member on opposite sides of a diameter thereof.

5. A friction drive comprising: a rotating drive member; a resilient rolling member in driven frictional engagement with said drive member; a driven member in driven frictional engagement with said resilient rolling member; a resilient compression ring member having its interior surface disposed in rolling frictional engagement with said drive member and said driven member; and a pair of rotating idler members in compressive engagement with said rolling member on opposite sides of a diameter thereof, said idler members also being disposed in rolling frictional engagement with the inner surface of said compression ring.

6. A friction drive comprising: a rotating drive member; a resilient rolling member in driven frictional engagement with said drive member; a driven member in driven frictional engagement with said resilient rolling member; a resilient compression ring member having its interior surface disposed in rolling frictional engagement with said drive member and said driven member; a pair of rotating idler members disposed in compressive engagement with said rolling member on opposite sides of a diameter thereof; and a second pair of idler members disposed in expansive engagement with said inner surface of said compression ring.

7. A friction drive comprising: a rotation drive member; a resilient rolling member in driven frictional engagement with said drive member; a first driven member in driven frictional engagement with said resilient rolling member, a resilient compression ring member having its interior surface disposed in rolling frictional engagement with said drive member and said first driven member; rotating idler members adapted to apply on expansive force to the interior surface of said compression ring and a compressive force to the exterior surface of said resilient rolling member; a second resilient rolling member in driven frictional engagement with said first driven member; a second driven member in driven frictional engagement with said second resilient rolling member; a second resilient compression ring member having its interior surface disposed in rolling frictional engagement with said first driven member and said second driven member; and additional rotating idler members adapted to apply a compressive force to the exterior surface of said second resilient rolling member.

8. A friction drive comprising: a rotating drive member; a resilient rolling member in driven frictional engagement with said drive member; a first driven member in driven frictional engagement with said resilient rolling member; a resilient compression ring member having its interior surface disposed in rolling frictional engagement with said drive member and said first driven member; a pair of rotating idler members in compressive engagement with said rolling member on opposite sides of a diameter thereof, said idler members also being disposed in rolling frictional engagement with the inner surface of said compression ring; a second resilient rolling member in driven frictional engagement with said first driven member; a second driven member in driven frictional engagement with said second resilient rolling member; a second resilient, compression ring member having its interior surface disposed in rolling frictional engagement with said first driven member and said second driven member; and an additional pair of rotating idler members disposed in compressive engagement with said second rolling member on opposite sides of a diameter thereof, said second idler members also being disposed in rolling, frictional engagement with the inner surface of said second compression ring.

References Cited

UNITED STATES PATENTS

| | | | |
|---|---|---|---|
| 1,853,737 | 4/1932 | Llewellyn | 74—206 |
| 2,602,339 | 7/1952 | Moen | 74—206 |

FOREIGN PATENTS

| | | |
|---|---|---|
| 490,681 | 1/1930 | Germany. |

ROBERT A. O'LEARY, Primary Examiner.

DAVID J. WILLIAMOWSKY, DONLEY J. STOCKING, Examiners.

L. H. GERIN, Assistant Examiner.